(12) United States Patent
Yu et al.

(10) Patent No.: US 11,443,116 B2
(45) Date of Patent: Sep. 13, 2022

(54) ELECTRONIC APPARATUS AND CONTROL METHOD THEREOF

(71) Applicant: SAMSUNG ELECTRONICS CO., LTD., Suwon-si (KR)

(72) Inventors: Heejae Yu, Suwon-si (KR); Sejeong Kwon, Suwon-si (KR); Hwamin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 16/674,318

(22) Filed: Nov. 5, 2019

(65) Prior Publication Data

US 2020/0142956 A1 May 7, 2020

(30) Foreign Application Priority Data

Nov. 5, 2018 (KR) .......................... 10-2018-0134200

(51) Int. Cl.
*G06F 40/295* (2020.01)
*G06N 20/00* (2019.01)
(Continued)

(52) U.S. Cl.
CPC ........... *G06F 40/295* (2020.01); *G06N 20/00* (2019.01); *G06Q 50/10* (2013.01); *H04W 4/021* (2013.01)

(58) Field of Classification Search
CPC ....... G10L 15/26; G10L 15/30; G10L 15/063; G06F 16/243; G06F 16/3329;
(Continued)

(56) References Cited

U.S. PATENT DOCUMENTS 7,418,443 B2 * 8/2008 Yoshimura .......... G06F 16/3329
8,560,300 B2   10/2013 Ferrucci et al.
(Continued)

FOREIGN PATENT DOCUMENTS

KR    10-2007-0092005    9/2007
KR    10-0881334         2/2009
(Continued)

OTHER PUBLICATIONS

Search Report and Written Opinion dated Feb. 19, 2020 in counterpart International Application No. PCT/KR2019/014368.
(Continued)

*Primary Examiner* — Gerald Gauthier
(74) *Attorney, Agent, or Firm* — Nixon & Vanderhye P.C.

(57) ABSTRACT

An electronic apparatus is provided. The electronic apparatus includes a memory configured to store an entity identification model, and a processor configured to control the electronic apparatus to: identify a plurality of entities included in an input sentence based on the entity identification model, acquire a search result corresponding to the plurality of entities, and correct and provide the input sentence based on the search result based on the plurality of entities not corresponding to the search result, wherein the entity identification model may be acquired by learning through an artificial intelligence algorithm to extract a plurality of sample entities included in each of a plurality of sample dialogues. At least a part of a method for identifying an entity from a dialogue may use an artificial intelligence model learned according to at least one of machine learning, a neural network, deep learning algorithm, or the like.

19 Claims, 19 Drawing Sheets

(51) Int. Cl.
*G06Q 50/10* (2012.01)
*H04W 4/021* (2018.01)

(58) Field of Classification Search
CPC ............... G06F 16/3344; G06F 16/532; G06F 16/5846; G06F 16/93; G06F 16/9535; G06F 40/268; G06F 40/295; G06F 40/30; G06F 40/40; G06F 16/248; G06F 16/9525; G06F 21/554; G06F 40/131; G06F 40/166; G06F 40/205; G06F 40/211; G06F 40/216; G06F 40/232; G06F 40/237; G06F 40/242; G06F 40/247; G06F 40/284; G06F 40/45; G06F 40/51; G06F 40/55; G06N 20/00; G06Q 50/10; G06Q 10/10; G06Q 30/00; H04W 4/021; G06V 30/414
USPC ......... 704/9, 235, 254, 2, 8, 256.2; 707/708, 707/741, 750
See application file for complete search history.

(56) References Cited

U.S. PATENT DOCUMENTS

| | | | | |
|---|---|---|---|---|
| 8,655,646 | B2* | 2/2014 | Lee | G06F 40/295 |
| | | | | 704/7 |
| 8,793,261 | B2* | 7/2014 | Jiang | G06F 16/3334 |
| | | | | 707/750 |
| 8,972,321 | B2 | 3/2015 | Ferrucci et al. | |
| 9,336,205 | B2* | 5/2016 | Moilanen | G06F 40/40 |
| 9,875,258 | B1* | 1/2018 | Hsiao | G06F 16/5846 |
| 9,971,763 | B2 | 5/2018 | Abdel-Reheem et al. | |
| 10,540,378 | B1* | 1/2020 | Hsiao | G06F 16/5854 |
| 2007/0067285 | A1 | 3/2007 | Blume et al. | |
| 2008/0275694 | A1* | 11/2008 | Varone | G06F 40/30 |
| | | | | 704/9 |
| 2009/0198488 | A1* | 8/2009 | Vigen | G06F 40/30 |
| | | | | 704/9 |
| 2009/0326923 | A1* | 12/2009 | Yan | G06F 40/30 |
| | | | | 704/10 |
| 2010/0063796 | A1* | 3/2010 | Rehberg | G06F 40/30 |
| | | | | 704/9 |
| 2011/0153654 | A1 | 6/2011 | Lee | |
| 2011/0257963 | A1* | 10/2011 | Zuev | G06F 40/30 |
| | | | | 704/E11.001 |
| 2011/0270607 | A1* | 11/2011 | Zuev | G06F 40/237 |
| | | | | 704/E15.001 |
| 2011/0295593 | A1* | 12/2011 | Raghuveer | G06Q 10/10 |
| | | | | 704/9 |
| 2011/0301941 | A1* | 12/2011 | De Vocht | G06F 40/216 |
| | | | | 704/9 |
| 2012/0010872 | A1* | 1/2012 | Zuev | G06F 40/30 |
| | | | | 704/9 |
| 2012/0084277 | A1* | 4/2012 | Barve | G06F 16/248 |
| | | | | 707/708 |
| 2013/0158984 | A1 | 6/2013 | Myslinski | |
| 2014/0040275 | A1* | 2/2014 | Dang | G06F 16/2228 |
| | | | | 707/741 |
| 2014/0058732 | A1* | 2/2014 | Labsky | G10L 15/30 |
| | | | | 704/254 |
| 2014/0142920 | A1* | 5/2014 | Chu-Carroll | G06F 16/951 |
| | | | | 704/9 |
| 2014/0180672 | A1* | 6/2014 | Mo | G06F 16/3344 |
| | | | | 704/9 |
| 2014/0236570 | A1* | 8/2014 | Heck | G06F 16/3329 |
| | | | | 704/9 |
| 2015/0100537 | A1 | 4/2015 | Grieves et al. | |
| 2015/0220511 | A1* | 8/2015 | Yang | G06F 16/3344 |
| | | | | 704/9 |
| 2015/0278198 | A1* | 10/2015 | Andreev | G06F 40/268 |
| | | | | 704/9 |
| 2015/0302002 | A1* | 10/2015 | Mathias | G06F 40/284 |
| | | | | 704/9 |
| 2015/0348551 | A1* | 12/2015 | Gruber | H04M 3/4936 |
| | | | | 704/235 |
| 2016/0012020 | A1* | 1/2016 | George | G06F 40/242 |
| | | | | 704/9 |
| 2016/0085745 | A1* | 3/2016 | Clark | G06F 40/211 |
| | | | | 704/9 |
| 2016/0147734 | A1* | 5/2016 | Allen | G06F 40/247 |
| | | | | 704/9 |
| 2016/0162474 | A1* | 6/2016 | Agarwal | G06Q 30/00 |
| | | | | 704/9 |
| 2016/0196258 | A1* | 7/2016 | Ma | G06F 40/51 |
| | | | | 704/8 |
| 2017/0219367 | A1 | 8/2017 | Liu et al. | |
| 2018/0024990 | A1* | 1/2018 | Okura | G06F 16/93 |
| | | | | 704/9 |
| 2018/0192144 | A1 | 7/2018 | McElroy | |
| 2020/0142956 | A1* | 5/2020 | Yu | G06N 20/00 |

FOREIGN PATENT DOCUMENTS

| | | |
|---|---|---|
| KR | 10-2011-0070057 | 6/2011 |
| KR | 10-1378162 | 3/2014 |
| KR | 10-2016-0038836 | 4/2016 |
| WO | 2014-105640 A1 | 7/2014 |

OTHER PUBLICATIONS

Extended European Search Report dated Apr. 2, 2020 in counterpart European Patent Application No. 19206827.8.
L. T. Anh et al., "Application of a Hybrid Bi-LSTM-CRF model to the task of Russian Named Entity Recognition", Oct. 8, 2017, 14 pages, XP055679690.
Konkol et al., "Latent semantics in Named Entity Recognition", Expert Systems with Applications, vol. 42, No. 7, May 2015, pp. 3470-3479, XP055679682.
Burtsev et al., "DeepPavlov: Open-Source Library for Dialogue Systems", Proceedings of the 56th Annual Meeting of the Association for Computational Linguistics-System Demonstrations, Melbourne, Australia, Jul. 2018, pp. 122-127, XP055597237.
European Examination Report dated Jun. 2, 2021 in corresponding European Patent Application No. 19206827.8.

* cited by examiner

FIG. 3B

There's no result of
'A PIZZA' IN YANGJAE.
Do you mean 'A PIZZA'
IN NONHYUN-DONG?

| YES | NO |

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2018-0134200, filed on Nov. 5, 2018, in the Korean Intellectual Property Office, the disclosure of which is incorporated by reference herein in its entirety.

BACKGROUND

Field

The disclosure relates to an electronic apparatus and a control method thereof. For example, the disclosure relates to an electronic apparatus that provides information according to a context and a control method thereof.

The disclosure relates to an artificial intelligence (AI) system which simulates a function of the human brain, such as recognition, determination, or the like, using machine learning algorithm, and an application thereof.

Description of Related Art

In recent years, artificial intelligence (AI) systems that implement human-level intelligence have been used in various fields. AI system is a system in which the machine learns, determines and becomes intelligent, unlike the existing rule-based smart system. The more the AI systems are used, the more the recognition rate is improved, and a preference of a user can be understood more accurately and thus, existing rule-based smart systems are gradually being replaced by deep learning-based AI systems.

The AI technology may include machine learning (for example, deep learning) and element technologies which utilize machine learning.

Machine learning may refer, for example, to an algorithm technology that classifies/learns the characteristics of input data by itself. Element technology may refer, for example, to a technology that simulates functions such as recognition and determination of human brain using machine learning algorithms such as deep learning, including linguistic understanding, visual understanding, reasoning/prediction, knowledge representation, motion control, etc.

Examples of various fields in which AI technology may be applied are as identified below. Linguistic understanding may refer, for example, to a technology for recognizing, applying, and/or processing human language or characters and includes natural language processing, machine translation, dialogue system, question and answer, voice recognition or synthesis, and the like. Visual understanding may refer, for example, to a technique for recognizing and processing objects as human vision, including object recognition, object tracking, image search, human recognition, scene understanding, spatial understanding, image enhancement, and the like. Inference prediction may refer, for example, to a technique for judging and logically inferring and predicting information, including knowledge-based and probability-based inference, optimization prediction, preference-based planning, recommendation, or the like. Knowledge representation may refer, for example, to a technology for automating human experience information into knowledge data, including knowledge building (data generation or classification), knowledge management (data utilization), or the like. Motion control may refer, for example, to a technique for controlling the autonomous running of the vehicle and the motion of the robot, including motion control (navigation, collision, driving), operation control (behavior control), or the like.

In the related art, a location information dictionary, a biographical dictionary, and an organization name dictionary are necessary to extract the information from a text, and this requires enormous capacity, and a lot of time is spent when searching an index. In addition, even if the location information is extracted through an extensive process, a logic for providing a user with information (maps, surrounding news, etc.) by one click has not yet been commercialized.

Accordingly, there is a necessity to develop a method for providing useful information to a user while reducing the required data capacity.

SUMMARY

Embodiments of the disclosure address the above disadvantages and other disadvantages not described above.

According to an example aspect of the disclosure, there is provided an electronic apparatus to improve speed of providing information according to a context and reduce required data capacity and a control method thereof.

According to an example embodiment, an electronic apparatus includes a memory storing an entity identification model, and a processor configured to control the electronic apparatus to: identify a plurality of entities included in an input sentence, the sentence being input based on the entity identification model, acquire a search result corresponding to the plurality of entities, and based on the plurality of entities not corresponding to the search result, correct and provide the input sentence based on the search result, wherein the entity identification model may be acquired by learning through an artificial intelligence algorithm to extract a plurality of sample entities included in each of a plurality of sample dialogues.

The processor may be configured to control the electronic apparatus to identify an attribute of each of the plurality of entities, and identify whether the plurality of entities corresponds to the search result based on at least one of the plurality of identified attributes.

The processor may, based on the plurality of entities not corresponding to the search result, be configured to control the electronic apparatus to provide a guide message indicating that the plurality of entities has an error.

The processor may be configured to control the electronic apparatus to acquire a search result that corresponds to at least two entities having different attributes.

The processor may be configured to control the electronic apparatus to acquire an importance for each of the plurality of entities based on a context of the input sentence, and identify whether a remaining entity corresponds to the search result based on an entity having a highest importance among the plurality of entities.

The processor may be configured to control the electronic apparatus to identify a plurality of words included in the input sentence, and identify the plurality of entities among the plurality of words based on a context of the input sentence.

The processor may, based on a second sentence that is subsequent to a first sentence among the input sentences being an affirmative sentence, be configured to control the electronic apparatus to identify a first word, among the plurality of words, identified in the first sentence as one of the plurality of entities.

The processor may, based on a second sentence that is subsequent to a first sentence among the input sentences being a negative sentence, be configured to control the electronic apparatus to not use a first word, among the plurality of words, identified in the first sentence as the plurality of entities.

The processor may, based on an error being present in the input sentence, be configured to control the electronic apparatus to correct and provide the input sentence.

The processor may, based on a user command being input, be configured to control the electronic apparatus to provide the plurality of entities used for acquiring the search result.

According to an example embodiment, a method of controlling an electronic apparatus includes: identifying a plurality of entities included in an input sentence, the sentence being input based on an entity identification model, acquiring a search result corresponding to the plurality of entities and, based on the plurality of entities not corresponding to the search result, correcting and providing the input sentence based on the search result, wherein the entity identification model may be obtained by learning through an artificial intelligence (AI) algorithm to extract a plurality of sample entities included in each of a plurality of sample dialogues.

The providing may include identifying an attribute of each of the plurality of entities, and identifying whether the plurality of entities corresponds to the search result based on at least one of the plurality of identified attributes.

The providing may further include, based on the plurality of entities not corresponding to the search result, providing a guide message indicating that the plurality of entities has an error.

The acquiring may include acquiring a search result that corresponds to at least two entities having different attributes.

The providing may include acquiring an importance for each of the plurality of entities based on a context of the input sentence, and identifying whether a remaining entity corresponds to the search result based on an entity having a highest importance among the plurality of entities.

The identifying may include identifying a plurality of words included in the input sentence, and identifying the plurality of entities among the plurality of words based on a context of the input sentence.

The identifying may include, based on a second sentence that is subsequent to a first sentence among the input sentences being an affirmative sentence, identifying a first word, among the plurality of words, identified in the first sentence as one of the plurality of entities.

The identifying may include, based on a second sentence that is subsequent to a first sentence among the input sentences being a negative sentence, not using a first word, among the plurality of words, identified in the first sentence as the plurality of entities.

The providing may include, based on an error being present in the input sentence, correcting and providing the input sentence.

The method may further include, based on a command being input, providing the plurality of entities used for acquiring the search result.

According to various example embodiments, the electronic apparatus may improve speed of providing information according to a context and reduce required data capacity using the entity identification model that is learned through the artificial intelligence algorithm.

BRIEF DESCRIPTION OF THE DRAWINGS

The above and/or other aspects, features, and advantages of certain embodiments of the present disclosure will be more apparent from the following detailed description, taken in conjunction with the accompanying drawings, in which:

FIGS. 3A, 3B, 3C, and 3D are diagrams illustrating an example error correction method according to an embodiment;

DETAILED DESCRIPTION

Figure 1A:
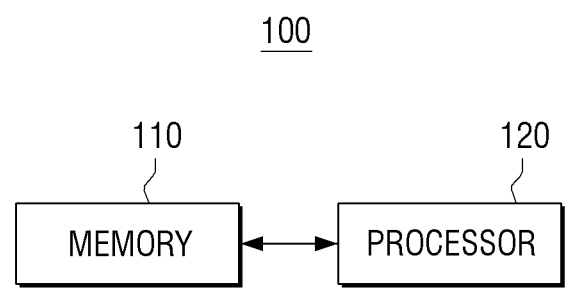
FIG. 1A is a block diagram illustrating an example configuration of an electronic apparatus according to an embodiment.

The various example embodiments of the present disclosure may be diversely modified. Accordingly, specific example embodiments are illustrated in the drawings and are described in greater detail in the detailed description. However, it is to be understood that the present disclosure is not limited to a specific example embodiment, but includes all modifications, equivalents, and substitutions without departing from the scope and spirit of the present disclosure. Also, well-known functions or constructions may not described in detail where they may obscure the disclosure with unnecessary detail.

Hereinafter, the disclosure will be described in greater detail with reference to the attached drawings.

General terms that are currently widely used are generally used as terms used in embodiments of the disclosure in consideration of functions in the disclosure, but may be changed depending on the intention of those skilled in the art or a judicial precedent, the emergence of a new technique, and the like. In addition, in a specific case, arbitrarily chosen terms may be used. In this case, the meaning of such terms may be mentioned in detail in a corresponding description portion of the disclosure. Therefore, the terms used in embodiments of the disclosure should be defined based on the meaning of the terms and the contents throughout the disclosure rather than simple names of the terms.

In this disclosure, the expressions "have," "may have," "include," or "may include" or the like represent presence of a corresponding feature (for example: components such as numbers, functions, operations, or parts) and does not exclude the presence of additional feature.

The expression "At least one of A or/and B" should be understood to represent "A" or "B" or any one of "A and B".

As used herein, the terms "first," "second," or the like may denote various components, regardless of order and/or importance, and may be used to distinguish one component from another, and does not limit the components.

In addition, the description in the disclosure that one element (e.g., a first element) is "(operatively or communicatively) coupled with/to" or "connected to" another element (e.g., a second element) should be interpreted to include both the case that the one element is directly coupled to the another element, and the case that the one element is coupled to the another element through still another element (e.g., a third element).

A singular expression includes a plural expression, unless otherwise specified. It is to be understood that the terms such as "comprise" or "consist of" may be used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part", and so on may be used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not shown).

In this disclosure, a term "user" may refer to a person using an electronic apparatus or an apparatus (for example: AI electronic apparatus) which uses an electronic apparatus.

Hereinafter, various example embodiments of the disclosure will be described in greater detail with reference to the accompanying drawings.

FIG. 1A is a block diagram illustrating an example configuration of an example electronic apparatus 100.

Referring to FIG. 1A, the electronic apparatus 100 includes a memory 110 and a processor (e.g., including processing circuitry) 120.

The electronic apparatus 100 according to various embodiments may include, for example, and without limitation, at least one of, smartphones, tablet PCs, mobile phones, video telephones, electronic book readers, desktop PCs, laptop PCs, netbook computers, workstations, servers, a personal digital assistant (PDA), a portable multimedia player (PMP), an MP3 player, a medical device, a camera, a wearable device, or the like. A wearable device may include, for example, and without limitation, at least one of the accessory type (e.g., a watch, a ring, a bracelet, a bracelet, a necklace, a pair of glasses, a contact lens or a head-mounted-device (HMD)); a fabric or a garment-embedded type (e.g., an electronic clothing); a body-attached type (e.g., a skin pad or a tattoo); a bio-implantable circuit, or the like. In some embodiments, the electronic apparatus 100 may include, for example, and without limitation, at least one of, a television, a digital video disk (DVD) player, audio, refrigerator, cleaner, ovens, microwaves, washing machines, air purifiers, set top boxes, home automation control panels, security control panels, media box (e.g.: Samsung HomeSync™, Apple TV™, or Google TV™), game consoles (e.g., Xbox™, PlayStation™), electronic dictionary, electronic key, camcorder, electronic frame, or the like.

In other embodiments, the electronic apparatus 100 may include, for example, and without limitation, at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), a photographing device, or ultrasonic wave device, etc.), navigation system, global navigation satellite system (GNSS), event data recorder (EDR), flight data recorder (FDR), automotive infotainment devices, marine electronic equipment (e.g., marine navigation devices, gyro compasses, etc.), avionics, security devices, car head units, industrial or domestic robots, drone, automated teller machine (ATM)s of financial institutions, points of sale of stores, Internet of Things (IoT) devices (e.g., light bulbs, sensors, sprinkler devices, fire alarms, thermostats, street lights, toasters, exercise equipment, hot water tanks, heater, boiler, etc.), or the like.

The electronic apparatus 100 may be any apparatus that is capable of receiving a sentence and providing information related to an input sentence.

The memory 110 may store an entity identification model. The entity identification model may be a model obtained by learning through an artificial intelligence algorithm to extract a plurality of sample entities included in each of the plurality of sample dialogues. An entity may refer, for example, to a meaningful unit of information that is provided by the entity identification model, and is also referred to as an entity name. For example, the entity may be in various forms such as food, an organization name, a place name, a country, a name, a name of a work of art, date, or the like, and may include a proper noun. For example, in the dialogue "a person infected with MERS came out" and "the person was found in A Hospital", the words "MERS", "A Hospital", or the like, may be an entity candidate. Among the entity candidates, "MERS" may be determined as the entity based on a context. For example, the processor 120 may identify a word included in a dialogue using an entity identification model, and extract an entity based on a frequency of use, a context, a relevance between entity candidates, or the like.

The entity identification model can be trained through an artificial intelligence algorithm to extract the sample entities "MERS" and "A Hospital" included in the sample dialogue of "a person infected with MERS came out" and "the person was found in A Hospital." The sample entity may be in a preset state for each sample dialogue. As described above, the entity identification model may be obtained by repeating the learning of the plurality of sample dialogues and the corresponding sample entities.

The memory 110 may be implemented, for example, and without limitation, as a hard disc, a non-volatile memory, a volatile memory, or the like, and can be any configuration that may store data.

The processor 120 may include various processing circuitry and may control overall operation of the electronic apparatus 100.

The processor 120 may include various processing circuitry including, for example, and without limitation, a digital signal processor (DSP) for processing a digital image signal, a microprocessor, a time controller (TCON), or the like, but is not limited thereto. The processor 120 may include various processing circuitry, such as, for example, and without limitation, one or more of a central processing unit (CPU), a micro controller unit (MCU), a micro processing unit (MPU), a controller, an application processor (AP), a communication processor (CP), an Advanced Reduced instruction set computing (RISC) Machine (ARM) processor, or the like, or may be defined as a corresponding term. The processor 120 may be implemented in a system on chip (SoC) type or a large scale integration (LSI) type which a processing algorithm is built therein or in a field programmable gate array (FPGA) type. The processor 120 may perform various functions by executing computer executable instructions stored in the memory 110.

The processor 120 may identify a plurality of entities included in a sentence that is input based on the entity identification model. For example, the processor 120 may identify at least one word included in a sentence that is input based on the entity identification model as the entity. The processor 120 may sequentially receive a plurality of sentences.

The processor 120 may identify a plurality of words included in an input sentence and identify a plurality of entities among a plurality of words based on a context of the input sentence.

For example, when a second sentence after a first sentence, among the input sentences, is an affirmative sentence, the processor 120 may identify a first word identified in the first sentence among the plurality of words as one of a plurality of entities. For example, when the sentences of "Do you want to eat A Pizza today?" "Yes", the processor 120 identifies words such as "today," "A Pizza" "eat?" and "yes", and as the second sentence is an affirmative sentence, the processor 120 may identify "A Pizza" as one of the plurality of entities. If a sentence is input additionally, the processor 120 may exclude "A Pizza" from the entity. If the additional sentence is input while the processor 120 identifies the plurality of entities, at least some of the plurality of entities may be excluded from the entity.

When the second sentence after the first sentence among the input sentences is a negative sentence, the processor 120 may not use the first word identified in the first sentence among the plurality of words as a plurality of entities. For example, if sentences such as "Do you want to eat pizza A today?", "No. I would like to eat B pizza," the second sentence is a negative sentence in a state where "A Pizza" is identified as the entity, "A Pizza" may not be used as the entity. In this example, processor 120 may identify only "B pizza" as the entity or wait for additional input of sentences. For example, the processor 120 may wait for an additional sentence based on the meaning of the word left as an entity candidate, or determine the left word as the entity and perform a subsequent operation.

The processor 120 may obtain a search result corresponding to the plurality of entities. For example, if "Seocho-dong", "A Jokbal (pigs' feet)" are identified as the entity, the processor 120 may perform a search using the identified entity. For example, when the electronic apparatus 100 is connected to a network, the processor 120 may obtain a search result corresponding to "Seocho-dong" or "A Jokbal" through an Internet search engine, or the like. The processor 120 may transmit the identified entity to an external server and receive a search result corresponding to the entity from the external server.

The processor 120 may provide information related to the obtained search result. The information related to the search result may include a search result corresponding to the plurality of entities. For example, the processor 120 may provide map information of A Jokbal located in Seocho-dong among search results corresponding to "Seocho-dong" and "A Jokbal". The information related to the search result may include information of correcting the input sentence. For example, when a plurality of entities and a search result correspond to each other, the processor 120 may provide information related to the search result. For example, the processor 120 may provide the address, the map, the sales, the brand reputation, the latest news, or the like, for the plurality of entities as the information related to the search result.

When the plurality of entities and the search result do not correspond with each other, the processor 120 may correct the input sentence based on the search result and provide the corrected sentence. For example, the processor 120 may provide a message indicating that the A Jokbal, which is a search result corresponding to "A Jokbal" among "Seocho-dong" and "A Jokbal", is in Songpa-dong. In this case, the processor 120 may provide information related to the search result in consideration of an attribute of "Seocho-dong" among the search results corresponding to "A Jokbal". The attribute of "Seocho-dong" may be a position attribute, which will be described in greater detail below.

The processor 120 may identify an attribute of each of the plurality of entities and may identify whether the plurality of entities and the search result correspond to each other based on at least one of the plurality of identified attributes. When a plurality of entities and a search result correspond to each other, the processor 120 may provide information related to the search result. For example, if "Seocho-dong", "A Jokbal" are identified as the entities, the processor 120 may identify that the attribute of "Seocho-dong" is a location attribute and "A Jokbal" is an organizational attribute. In addition, the processor 120 may identify whether the address of "A Jokbal" is within a predetermined distance from Seocho-dong based on the location attribute among the location attribute and organization attribute. The processor 120 may determine that a plurality of entities and a search result correspond to each other when the address of "A Jokbal" is within a predetermined distance from Seocho-dong, and provide information related to the search result.

When the plurality of entities does not correspond to the search result, the processor 120 may provide a message indicating that there is an error in the plurality of entities. In the above example, if the address of "A Jokbal" is not within the predetermined distance from Seocho-dong, the processor 120 may provide a guide message that the address of "A Jokbal" is not Seocho-dong, and map information indicating the address of "A Jokbal."

The processor 120 may identify the entity having a high importance between the first entity and the second entity, and generate an interrogative sentence based on the attribute of the entity with low importance and the entity with high importance. For example, the processor 120 may generate an interrogative sentence through the entity identification model. The processor 120 may correct the entity with low importance from a search result based on the entity with high importance and a search result based on the interrogative sentence.

For example, the processor 120 may identify "Musee D'Orsay" and "the Mona Lisa" as the entity from the sentence "Let's see the Mona Lisa when visiting Musee D'Orsay." In addition, when it is determined that the importance of "the Mona Lisa" among the "Musee D'Orsay" and "the Mona Lisa" is higher, the processor 120 may generate an interrogative sentence based on the organization attribute of "Musee D'Orsay" and "the Mona Lisa." For example, the processor 120 may generate an interrogative sentence such as "can you see the Mona Lisa?" if you go to "which $organization$". The processor 120 may correct the "Musee D'Orsay" to "Musee du Louvre" from a search result based on "the Mona Lisa" and a search result based on an interrogative sentence. The processor 120 may acquire a search result corresponding to at least two entities having different attributes. However, the embodiment is not limited thereto, and the processor 120 may obtain a search result corresponding to an entity having the same attribute, and the search result corresponding to a first entity having the same attribute and a third entity having a different attribute from the second entity.

The processor 120 may acquire the importance for each of the plurality of entities based on a context of the input sentence, and identify whether the remaining entities correspond to the search result based on the entity having the highest importance among the plurality of entities.

For example, the processor 120 may obtain importance for each of the plurality of entities based on at least one of a frequency of use of each of the plurality of entities, a context, and a relevance between the entity candidates. The processor 120 may acquire the first search result for the first entity having the highest importance among the plurality of entities, and search for the second entity having the next highest importance in the first search result. If the second entity is not found in the first search result, the processor 120 may identify (e.g., determine) that the second entity does not correspond to the search result, and provide a guide message indicating that the second entity has an error. The processor 120 may perform an additional search based on at least one of an attribute of the first entity and an attribute of the second entity. For example, if the second entity is a location attribute, the processor 120 may search for the entity of the location attribute from the first search result and provide a message that the entity of the searched location attribute is related to the first entity.

The embodiment is not limited thereto, and the processor 120 may determine whether the entity corresponds to the search result using various methods.

The processor 120 may correct the sentence that is input when there is an error in the input sentence and provide the corrected sentence. For example, when the first entity and the second entity are identified in the first sentence, and there is an error in the search result corresponding to the first entity and the second entity, the processor 120 may correct and provide at least one of the first entity and the second entity based on the search result. In this example, the processor 120 may provide a guide message indicating that there is an error or a guide message for correcting an error.

After acquiring information related to the search result, when a newly input sentence is an affirmative sentence, the processor 120 may provide information related to the search result. The processor 120 may provide information related to the search result when the plurality of entities corresponds to the search result.

When the first entity and the second entity are identified from the first sentence, the search result corresponding to the first entity and the second entity is acquired, and the second sentence which is an affirmative sentence is input, the processor 120 may provide information related to the search result. The processor 120 may update the entity whenever a sentence is input, perform search using the updated entity, and provide information related to the search result based on a context.

The embodiment is not limited thereto, and the processor 120 may determine a time point for providing information related to a search result using any of various methods. For example, when a sentence is input and the search result is limited to less than or equal to the predetermined number, the processor 120 may provide information related to the search result. For example, the processor 120 may acquire 20 search results as a result of search for the first entity and the second entity, and then acquire one of the 20 search results by the third entity included in a sentence that is input subsequently. The processor 120 may provide information based on one search result. The processor 120 may provide information by identifying that even the plurality of search results is identical in content.

The processor 120 may provide information related to the search result of a predetermined category among a plurality of search results. For example, the processor 120 may acquire 20 search results as a result of the first entity and the second entity, and the 20 search results may include information of various categories such as time information, location information, photo information, or the like. When the third entity that is subsequently input is the location attribute, the processor 120 may provide the location information among the 20 search results.

When a user command is input, the processor 120 may provide a plurality of entities used for acquiring a search result. For example, the processor 120 may acquire a search result corresponding to the first entity and the second entity, and provide information related to the search result. When a user command is input, the processor 120 may provide the first entity and the second entity. The user may input a command to delete one of the first entity and the second entity to request a search result corresponding to the first entity. The user may input a command to add a third entity to the first entity and the second entity, and request a search result corresponding to the first entity, the second entity, and the third entity.

Figure 1B:
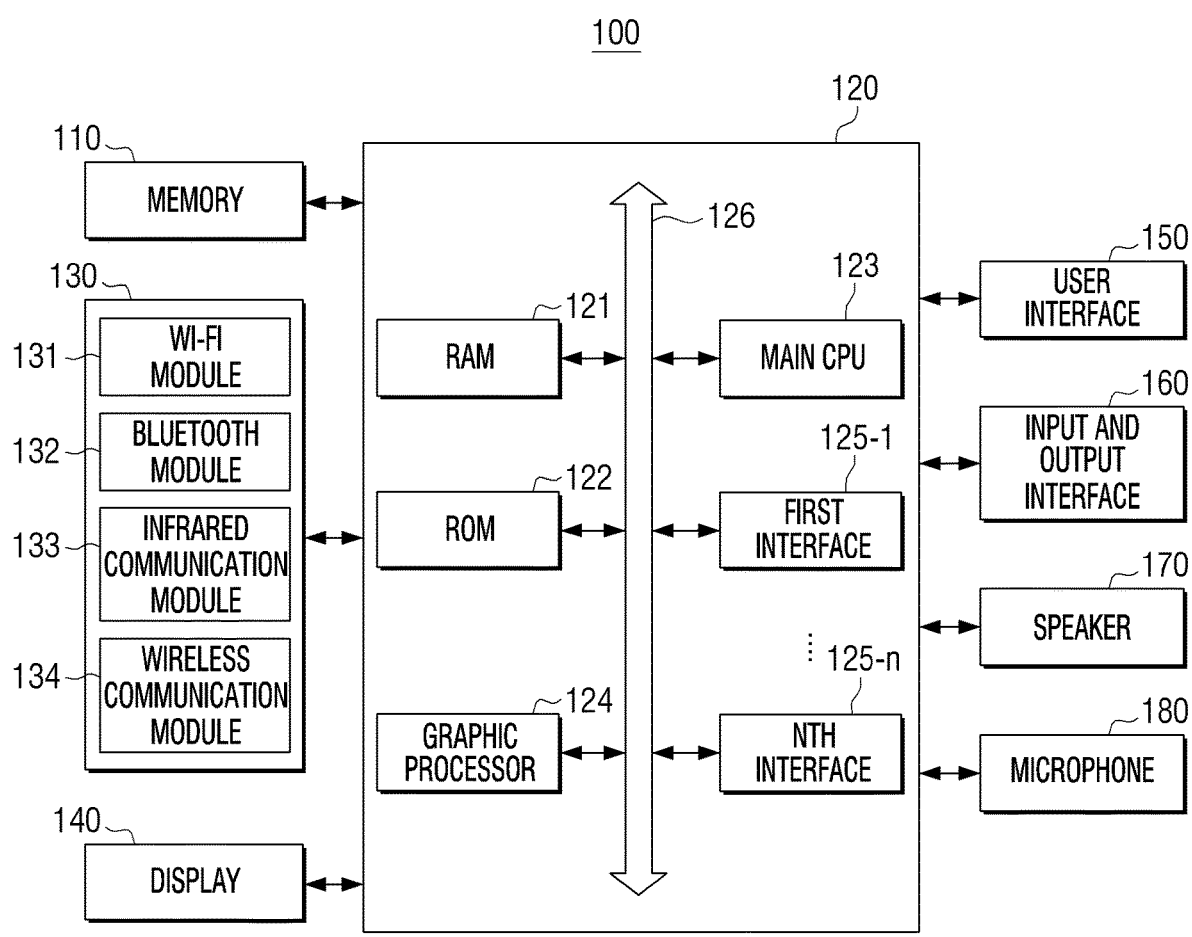
FIG. 1B is a block diagram illustrating an example configuration of an electronic apparatus according to an embodiment.

FIG. 1B is a block diagram illustrating an example configuration of an electronic apparatus according to an embodiment. The electronic apparatus 100 may include the memory 110 and the processor 120. Referring to FIG. 1B, the electronic apparatus 100 may further include a communication interface (e.g., including communication circuitry) 130, a display 140, a user interface (e.g., including user interface circuitry) 150, an input and output interface (e.g., including input/output circuitry) 160, a speaker 170, and a microphone 180. Among the elements of FIG. 1B, the detailed description of parts overlapping with the elements of FIG. 1A may not be repeated here.

The memory 110 is electrically connected to the processor 120 and may store data necessary for various embodiments. The memory 110 may be implemented as an internal memory such as, for example, and without limitation, a read only memory (for example, electrically erasable programmable read-only memory (EEPROM)), random-access memory (RAM), or the like, included in the processor 120, or a memory separate from the processor 120. In this example, the memory 110 may be implemented as a memory embedded with the electronic apparatus 100, or may be implemented as a detachable memory in the electronic apparatus 100, according to the data usage purpose. For example, data for driving the electronic apparatus 100 may be stored in a memory embedded in the electronic apparatus 100, and data for an expanded function of the electronic apparatus 100 may be stored in the memory detachable to the electronic apparatus 100. A memory embedded in the electronic apparatus 100 may be a volatile memory such as, for example, and without limitation, a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive, a solid state drive (SSD), or the like. In the case of a memory detachably mounted to the electronic apparatus 100, the memory may be implemented as, for example, and without limitation, a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like.

The memory 110 may store various data such as an operating system (OS) software module to drive the electronic apparatus 100, an entity identification module, a search module, an information providing module, or the like.

The processor 120 may include various processing circuitry and controls overall operations of the electronic apparatus 100 using various programs stored in the memory 110.

The processor 120 includes the RAM 121, the ROM 122, a main CPU 123, a graphics processor 124, first to $n^{th}$ interfaces 125-1~125-$n$, and a bus 126.

The RAM 121, ROM 122, main CPU 123, graphics processor 124, the first to $n^{th}$ interfaces 125-1 to 125-$n$, or the like, may be interconnected through the bus 126.

The ROM 122 stores one or more instructions for booting the system and the like. When the turn-on instruction is input and power is supplied, the CPU 123 copies the OS stored in the memory 110 to the RAM 121 according to the stored one or more instructions in the ROM 122, and executes the OS to boot the system. When the booting is completed, the CPU 123 copies various application programs stored in the memory 110 to the RAM 121, executes the application program copied to the RAM 121, and performs various operations.

The main CPU 123 accesses the memory 110 and performs booting using an operating system (OS) stored in the memory 110, and performs various operations using various programs, contents data, or the like, stored in the memory 110.

The first to $n^{th}$ interface 125-1 to 125-$n$ are connected to the various elements described above. One of the interfaces may be a network interface connected to an external device through the network.

The processor 120 may perform a graphic processing function (video processing function) using, for example, the graphics processor 124. For example, the processor 120 may generate a screen including various objects such as icons, images, text, and the like. A calculator (not shown) may calculate an attribute value such as a coordinate value, a shape, a size, and a color to be displayed by each object according to the layout of the screen based on the received control command. A renderer (not shown) may generate display screens of various layouts including objects based on the attribute value calculated by the calculator (not shown). The processor 120 may perform various image processing such as decoding, scaling, noise filtering, frame rate conversion, resolution conversion, or the like, for the video data.

The processor 120 may perform processing of audio data. For example, the processor 120 may perform various image processing such as, for example, and without limitation, decoding, amplifying, noise filtering, and the like, on the audio data.

The communication interface 130 may include various communication circuitry and communicate with other external devices in various types. The communication interface 130 may include various modules including various communication circuitry, such as, for example, and without limitation, a Wi-Fi module 131, a Bluetooth module 132, an infrared communication module 133, a wireless communication module 134, or the like. Each communication module may include communication circuitry and be implemented as at least one hardware chip format.

The processor 120 may communicate with various external devices using the communication interface 130. The external device may include, for example, and without limitation, a display device such as a TV, an image processing device such as a set-top box, an external server, a control device such as a remote control, an audio output device such as a Bluetooth speaker, a lighting device, a smart cleaner, a home appliance such as a smart refrigerator, a server such as an Internet of things (IOT) home manager, or the like.

The Wi-Fi module 131 and the Bluetooth module 132 perform communication using Wi-Fi method and Bluetooth method, respectively. When using the Wi-Fi module 131 or the Bluetooth module 132, various connection information such as a service set identifier (SSID) and a session key may be transmitted and received first, and communication information may be transmitted after communication connection.

The infrared ray communication module 133 performs communication according to infrared data association (IrDA) technology that transmits data wireless to local area using infrared ray between visible rays and millimeter waves.

The wireless communication module 134 may refer, for example, to a module performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the Wi-Fi module 131 and the Bluetooth module 132 described above.

The communication interface 130 may include at least one of a local area network (LAN) module, Ethernet module, or wired communication module performing communication using a pair cable, a coaxial cable, an optical cable, or the like.

According to an embodiment, the communication interface 130 may use the same communication module (for example, Wi-Fi module) to communicate with an external device such as a remote controller and an external server.

In accordance with another example, the communication interface 130 may utilize different communication modules (for example, Wi-Fi modules) to communicate with an external device such as a remote controller and an external server. For example, the communication interface 130 may use at least one of an Ethernet module or a Wi-Fi module to communicate with an external server, and may use a bluetooth (BT) module to communicate with an external device such as a remote controller. However, this is merely an example, and the communication interface 130 may use at least one communication module among various communication modules when communicating with a plurality of external devices or an external server.

The electronic apparatus 100 may further include a tuner and a demodulator according to an example.

The tuner (not shown) may receive a radio frequency (RF) broadcasting signal by tuning a channel selected by a user or all the prestored channels, from among RF broadcasting signals that are received through the antenna.

A demodulator (not shown) may receive and demodulate a digital intermediate frequency (DIF) signal that is converted by the tuner, and perform channel decoding, or the like.

The display 140 may be implemented as various types of a display such as, for example, and without limitation, a liquid crystal display (LCD), an organic light emitting diode (OLED) display, a plasma display panel (PDP), or the like. In the display 140, a driving circuit and a backlight unit, which may be implemented in the form of an a-si TFT, a low temperature poly silicon (LTPS) TFT, an organic TFT (OTFT) may be included as well. The display 160 may be implemented as a touch screen coupled with a touch sensor, a flexible display, a third-dimensional display (3D display), or the like.

The display 140 according to an embodiment may include not only a display panel for outputting an image but also a bezel for housing a display panel. In particular, the bezel according to an embodiment may include a touch sensor (not shown) to sense a user interaction.

The user interface 150 may include various user interface circuitry and be implemented as a device such as, for example, and without limitation, a button, a touch pad, a mouse, and a keyboard, or implemented as a touch screen which is capable of performing the aforementioned display function and a manipulation input function as well. The button may be various types of buttons such as a mechanical button, a touch pad, a wheel, and the like formed in an arbitrary area such as a front surface portion, a side surface portion, and a back surface portion of the main body of the electronic apparatus 100.

The input and output interface 160 may include various input/output circuitry and be at least one interface among, for example, and without limitation, high definition multimedia interface (HDMI), mobile high definition link (MHL), universal serial bus (USB), display port (DP), Thunderbolt, video graphics array (VGA) port, RGB port, d-subminiature (D-SUB), digital visual interface (DVI), and the like.

The input and output interface 160 may input and output at least one of an audio signal and a video signal.

According to an embodiment, the input and output interface 160 may include a port for inputting and outputting only an audio signal and a port for inputting and outputting only a video signal as separate ports, or may be implemented as one port for inputting and outputting both an audio signal and a video signal.

The electronic apparatus 100 may be implemented as an apparatus not including a display and transmit a video signal to a separate display device.

The speaker 170 may include, for example, an element including circuitry to output various audio data, various alarm sounds, a voice message, or the like, which are processed by the input and output interface 160.

A microphone 180 may include, for example, an element including circuitry to receive a user's voice or other sound and convert the received voice or sound to audio data.

The microphone 180 may receive the user voice in an active state. For example, the microphone 180 may be integrally formed as an integral unit on an upper side, a front side direction, a side direction, or the like of the electronic apparatus 100. The microphone 180 may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

The electronic apparatus 100 may receive a user voice signal from an external device including a microphone. In this example, the received user voice signal may be a digital audio signal, but according to an embodiment, the signal may be an analog audio signal. For example, the electronic apparatus 100 may receive a user voice signal through a wireless communication method such as Bluetooth or Wi-Fi method. The external device may be implemented as a remote control device or a smartphone.

The electronic apparatus 100 may transmit the corresponding voice signal to an external server for voice recognition of the voice signal received from an external device.

A communication module for communicating with the external device and the external server may be implemented separately. For example, communication with the external device may be performed through a Bluetooth module, and communication with the external server may be performed through the Ethernet modem or the Wi-Fi module.

The electronic apparatus 100 may receive a voice and convert the voice to a sentence. For example, the electronic apparatus 100 may directly apply a speech to text (STT) function to the digital audio signal received through the microphone 170 and convert the signal to text information.

The electronic apparatus 100 may transmit a received digital audio signal to a voice recognition server. In this case, the voice recognition server may convert the digital audio signal into text information using a speech to text (STT). The voice recognition server may transmit text information to another server or an electronic apparatus to perform a search corresponding to the text information, and in some cases, perform a direct search.

Through the above method as described, for example, with reference to FIG. 1A, the processor 120 may provide information that matches the context from an input sentence. In particular, the processor 120 may identify the entity without information on a dictionary by separate entities according to use of the entity identification model.

Hereinbelow, an operation of the electronic apparatus 100 will be described in greater detail.

FIGS. 2A, 2B, 2C, and 2D are diagrams illustrating a screen of an example electronic apparatus according to an embodiment.

The processor 120 may receive a sentence. This sentence may be input via one of a variety of applications installed in the electronic apparatus 100. For example, the processor 120 may receive dialogue contents with other people through a messenger application. However, the embodiment is not limited thereto, and the processor 120 may receive a sentence from one of a variety of applications, such as a chat application, an application that provides a web page, or the like.

Figure 2A:
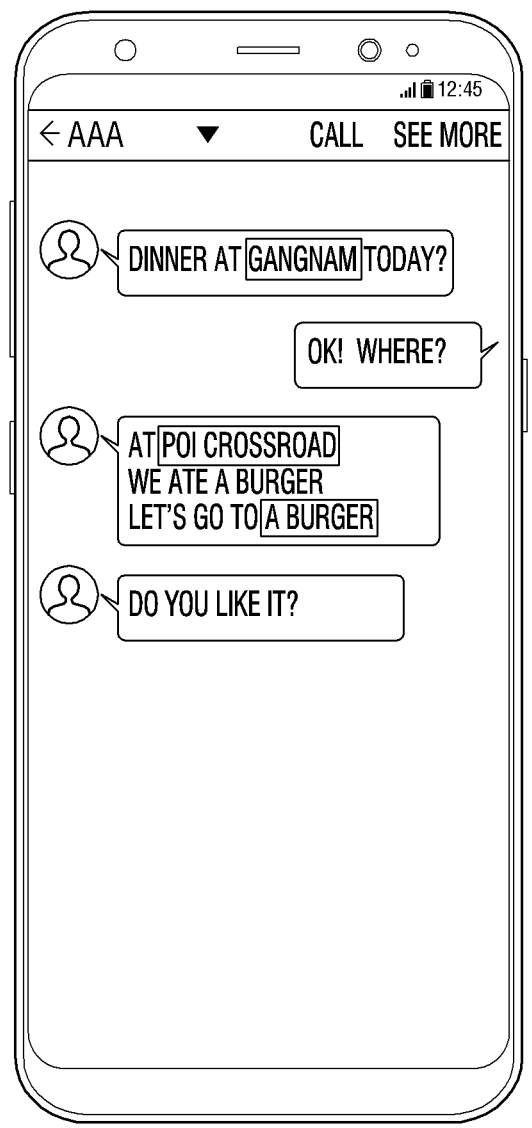
FIGS. 2A, 2B, 2C, and 2D are diagrams illustrating an example electronic apparatus according to an embodiment.

The processor 120 may receive a sentence by a user. The processor 120 may receive a sentence from an external device through the communication interface 130. FIG. 2A is a diagram illustrating an example in which a second sentence is input from a user after a first sentence is received from an external device, and then a third sentence and a fourth sentence are received from an external device.

The processor 120 may identify "Gangnam" included in the first sentence as one of the plurality of entities based on the entity identification model. The processor 120 may identify the attribute of "Gangnam" as the location attribute.

When the second sentence is input, the processor 120 may update a plurality of entities based on the entity identification model. For example, the processor 120 may identify "where" included in the second sentence as the entity and identify the attribute of "where" as the location attribute. The processor 120 may maintain only "Gangnam" and "where" that have the same attribute, among the entity identified from the first sentence and the entity identified from the second sentence as the plurality of entities.

The processor 120 may identify a current context based on "OK." After the second sentence is input, the processor 120 may maintain "Gangnam" and "where" having the same attribute among the entity identified from the first sentence and the entity identified from the second sentence as the plurality of entities based on "OK." If a word such as "No" is included in the second sentence, the processor 120 may delete entire entity identified from the first sentence.

When the third sentence is input, the processor 120 may identify "Poi Crossroad" corresponding to the location attribute and "A Burger" corresponding to the organization attribute. As "Poi Crossroad" is the location attribute, the processor 120 may add it as the entity. The processor 120 may add "A Burger" corresponding to the organization attribute having a high relevance with the location attribute as the entity.

When there is no input from a user of the electronic apparatus 100 for a predetermined time, the processor 120 may perform searching using the identified entity. The processor 120 may perform searching using the entity that is identified from the first sentence after the first sentence is input, perform searching using the updated entity after the second sentence is input, and perform searching using the updated entity after the third sentence is input. In addition, the processor 120 may provide information related to the search result when there is no input for a predetermined time from the user of the electronic apparatus 100. The processor 120 may perform a search or provide a search result when a query requesting confirmation is input, such as the fourth sentence.

Figure 2B:
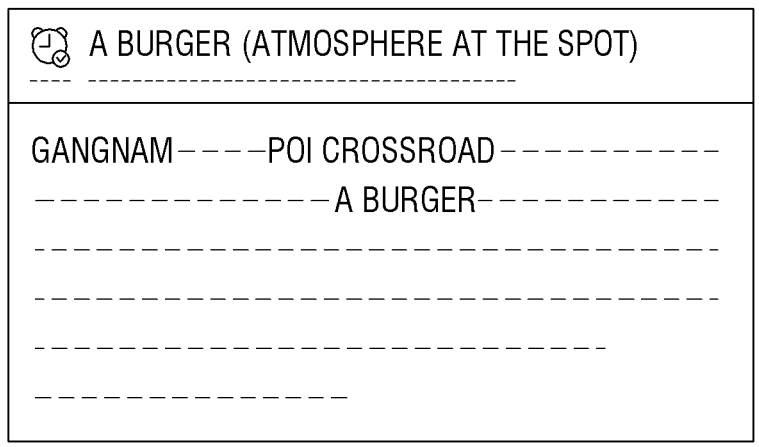

As illustrated in FIG. 2B, the processor 120 may extract a search result. FIG. 2B is a diagram illustrating an example of a webpage including a plurality of entities. The embodiment is not limited thereto, and the processor 120 may acquire a plurality of webpages and extract common information corresponding to the plurality of entities from the plurality of webpages. When the entity is updated as an additional sentence is input, the processor 120 may delete a part of the plurality of webpages based on the updated entity.

The processor 120 may obtain additional information from the search result. For example, if the processor 120 searches for "Gangnam", "Poi Crossroad", or "A Burger" from a web page, the processor 120 may obtain additional information about at least one of "Gangnam", "Poi Crossroad" or "A Burger". For example, the processor 120 may obtain the correct address, map, sales, brand reputation, the latest news, etc. of "A Burger" as additional information about "A Burger."

A subject of acquiring the additional information may be determined based on an attribute of the entity. For example, the processor 120 may determine that the organization attribute such as "A Burger" has higher importance than the location attribute of "Gangnam" and "Poi Crossroad," and obtain additional information of "A Burger."

When the location of "A Burger" is within a predetermined distance such as "Gangnam" and "Poi Crossroad" from the search result, the processor 120 may obtain the additional information.

Figure 2C:
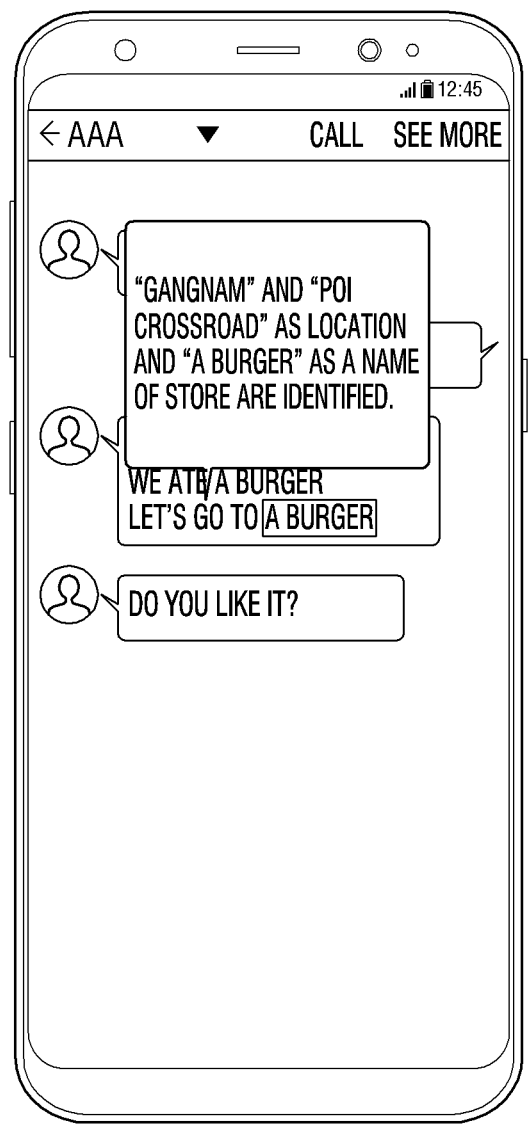
Figure 2D:
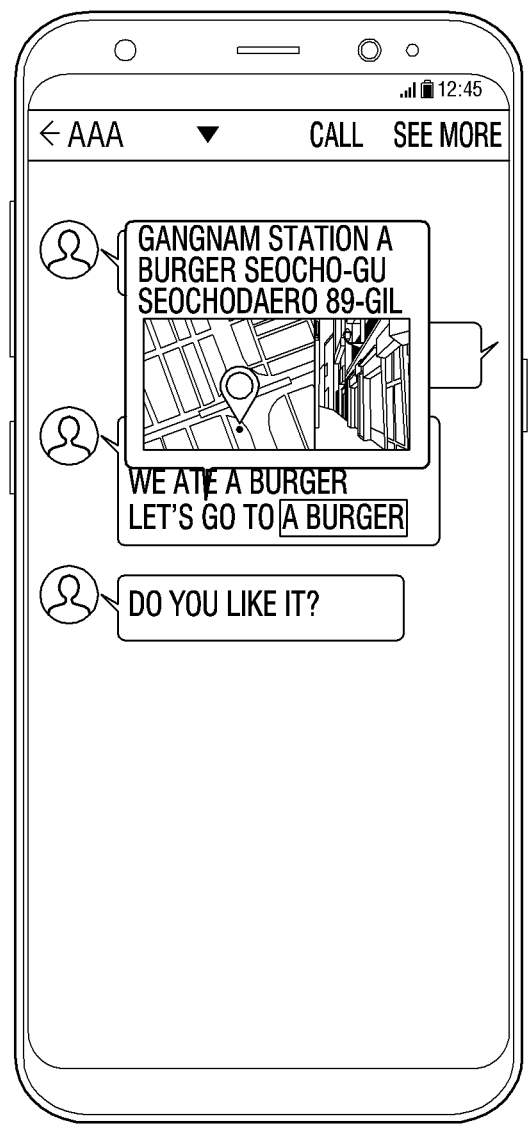
Figure 3A:
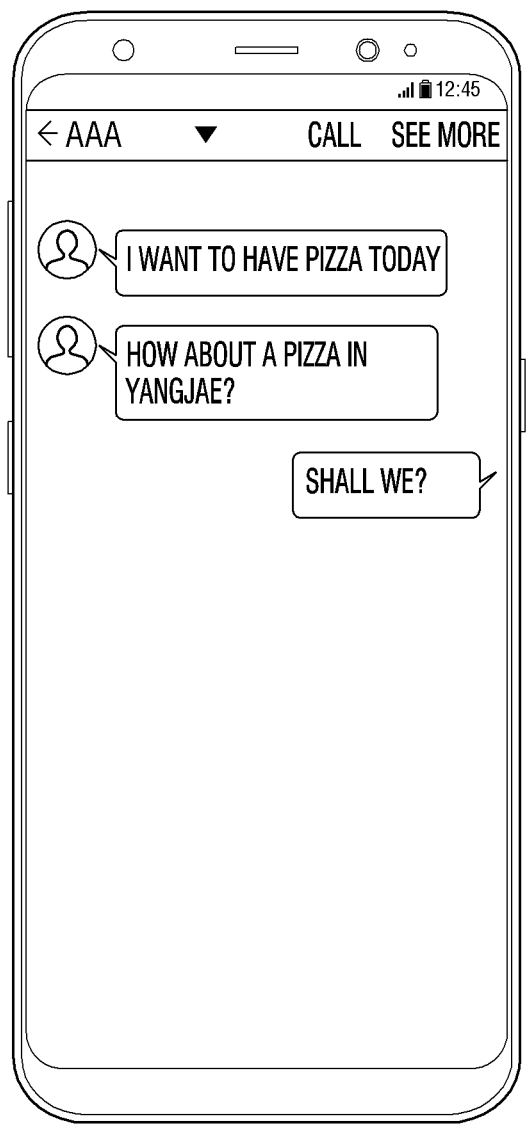
Figure 3C:
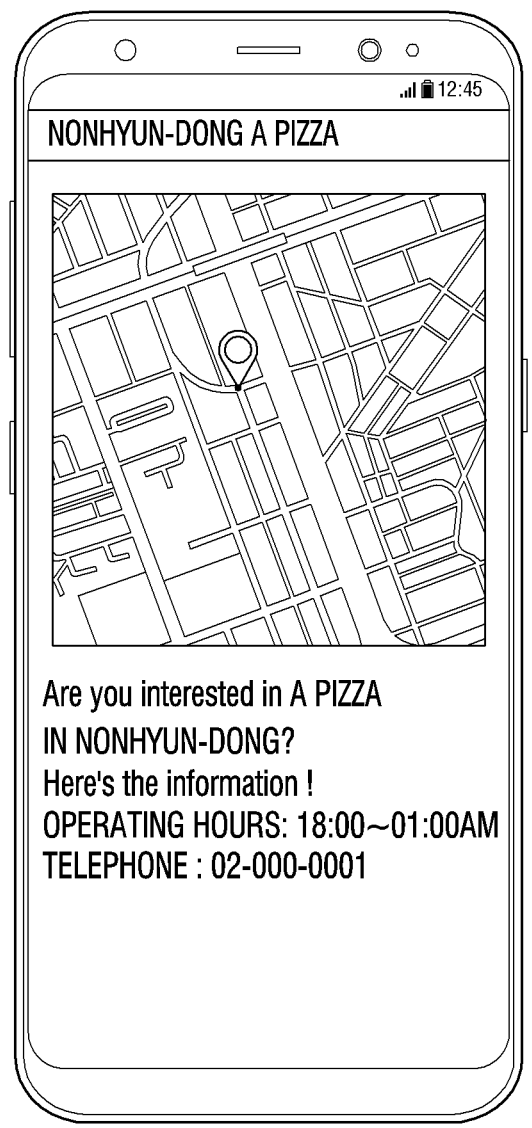
Figure 3D:
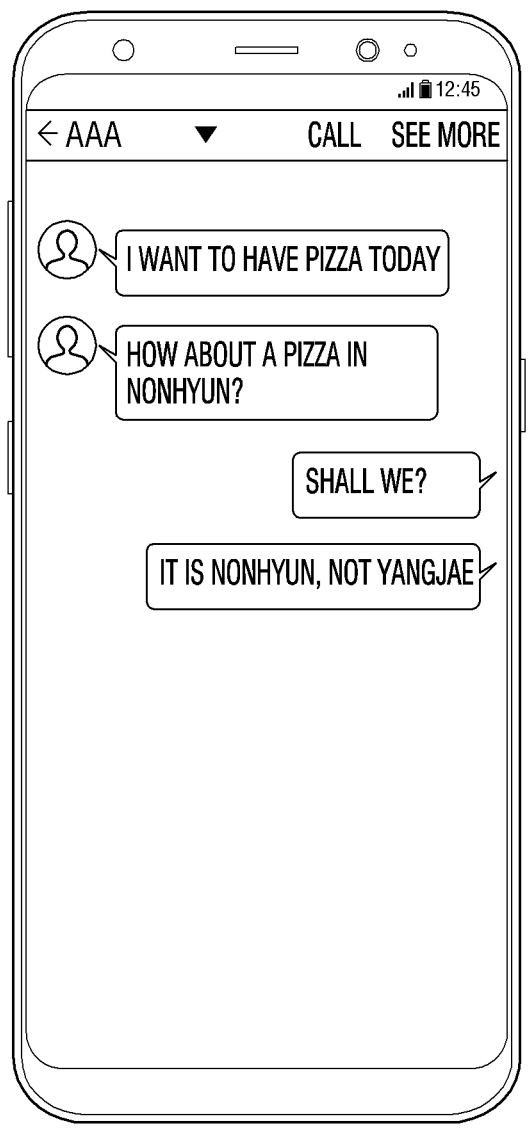

As illustrated in FIG. 2C, the processor 120 may display that "Gangnam" and "Poi Crossroad" are locations, and "A Burger" is a name of a store, and as illustrated in FIG. 2D, the processor 120 may display map information on the "A Burger." The processor 120 may display first information such as FIG. 2C and second information as FIG. 3D. The processor 120 may display at least one of the first information or second information.

The processor 120 may display only the first information and display the second information according to a user's input. For example, the processor 120 may display the first information and display the second information when the user touches an area in which the first information is displayed. The processor 120 may obtain a plurality of second information having different categories, and display each category together with the first information. For example, the processor 120 may display an icon such as a map, latest news, etc. together with the first information, and if one of the icons is selected, the processor 120 may provide the second information corresponding to the selected icon.

In FIGS. 2A, 2B, 2C and 2D, an operation of the processor 120 has been described with a location attribute, an organization attribute, or the like, but it is not limited thereto. For example, and without limitation, the processor 120 may identify the entity using various attributes such as a time attribute, an activity attribute, a positive attribute, a negative attribute, a figure attribute, a hobby attribute, or the like.

FIGS. 3A, 3B, 3C, and 3D are diagrams illustrating an example error correction method according to an embodiment.

The processor 120 may receive the first sentence and the second sentence from an external device and identify "Yangjae" and "A Pizza" as the entities. The processor 120 may acquire a search result corresponding to "Yangjae" and "A Pizza", as the third sentence of a positive context is input from a user.

The processor 120 may identify that the distance difference between the two points is greater than or equal to the predetermined distance according to the location attributes of "Yangjae" and "A Pizza". Since the distance difference is greater than or equal to the predetermined distance, the processor 120 may search the location of "A Pizza" again, and obtain a search result that "A Pizza" is not located in "Yangjae" but in "Nonhyun". As shown in FIG. 3B, the processor 120 may display a guide message for confirming whether "A Pizza" is located at "Nonhyun."

When "A Pizza" is not located in "Yangjae", but correct location information is not searched, the processor 120 may display a guide message that "A Pizza" is not located in "Yangjae."

When a user touches a Yes icon in a guide message of FIG. 3B, the processor 120 may provide additional information of "A Pizza" such as a map, a contact, an operating hour of "A Pizza" located in "Nonhyun" as illustrated in FIG. 3C.

Through this operation, as illustrated in FIG. 3D, the user may provide information that "A Pizza" is located in "Nonhyun" to a counterpart. The processor 120 may correct "Yangjae" in the pre-received second sentence to "Nonhyun."

Figure 4A:
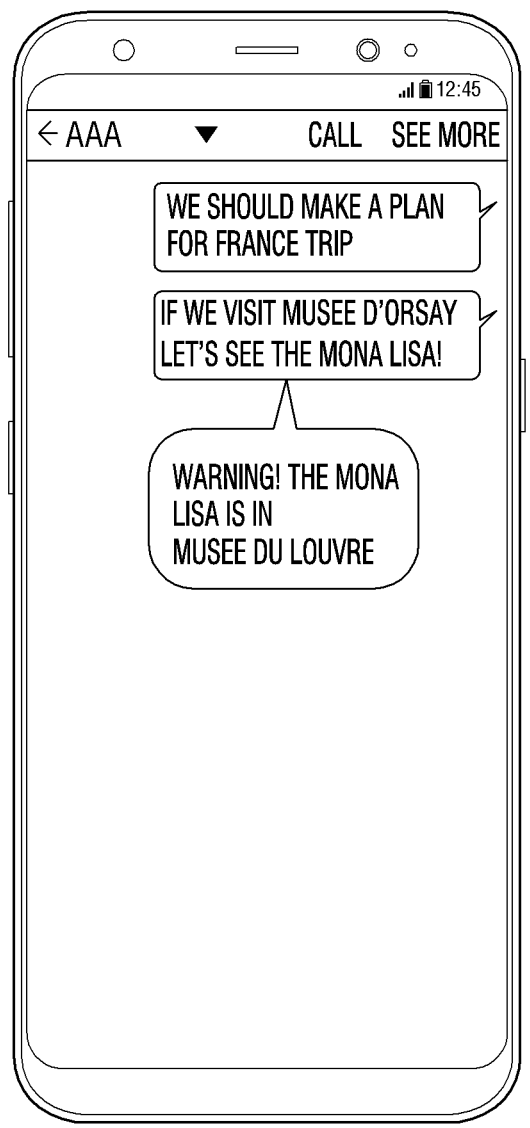
FIGS. 4A and 4B are diagrams illustrating an example error correction method according to another embodiment.
Figure 4B:

FIGS. 4A and 4B are diagrams illustrating an example error correction method according to another embodiment.

The processor 120 may identify the entities by sentences and identify an error state based on a search result corresponding to the identified entity. For example, as illustrated in FIG. 4A, the processor 120 may receive the first sentence and the second sentence and identify "Musee D'Orsay" and "the Mona Lisa" in the second sentence as the entities.

The processor 120 may perform a search using "Musee D'Orsay" and "the Mona Lisa", and as a result of the search, the processor 120 may display a guide message that "the Mona Lisa" is in the "Musee du Louvre." The processor 120 may display that "the Mona Lisa" is not in the Musee D'Orsay."

In FIG. 4A, it has been described that a guide message is displayed after a sentence input by a user is transmitted, but the embodiment is not limited thereto. For example, as illustrated in FIG. 4B, the processor 120 may identify the entity in real-time while entering the sentence, and perform the search using the identified entity. The processor 120 may display a guidance message that "the Monna Lisa" is in the "Musee Du Louvre" according to the search result, even before the user's input sentence is transmitted.

Figure 5:
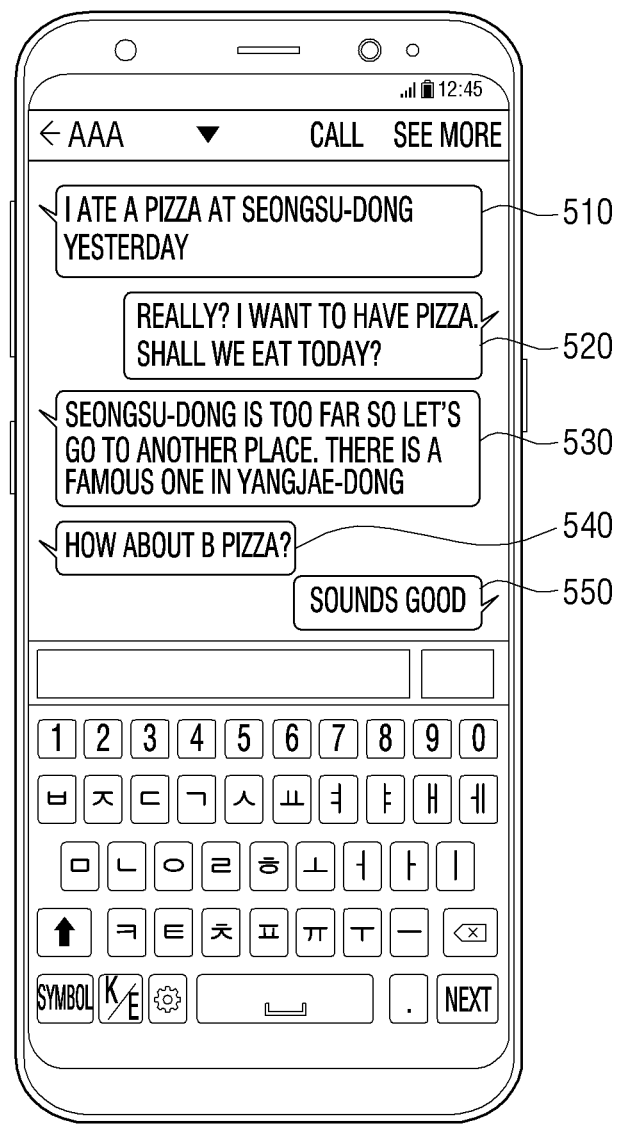
FIG. 5 is a diagram illustrating an example method for using a context according to an embodiment.

FIG. 5 is a diagram illustrating an example method for using a context according to an embodiment.

The processor 120, when a first sentence 510 is input, may identify "Seongsu-dong" and "A Pizza" as the entity.

When a second sentence 520 is input, the second sentence 520 has a positive expression and "pizza" is included in the first sentence and the second sentence in common and thus, the processor 120 may assign higher importance to "A Pizza" than "Seongsu-dong."

When a third sentence 530 is input, the processor 120 may add "Yangjae-dong" as a new entity. The processor 120 may lower importance of "Seongsu-dong" due to a negative expression of "Seongsu-dong" than "Yang ae-dong."

When a fourth sentence 540 is input, the processor 120 may add "B Pizza" as a new entity.

When a fifth sentence 550 is input, the fifth sentence 550 is a positive expression and the processor 120 may assign relatively higher importance to "B Pizza" than "A Pizza."

The processor 120 may perform a search using "Yangjae-dong" having the highest importance among the location attributes and "B Pizza" having the highest importance among the organization attributes. However, the embodiment is not limited thereto, and the processor 120 may further perform a search by using not only "Yangjae-dong" and "B Pizza" but also "Seongsu-dong" and "A Pizza" having relatively low importance. In this case, the processor 120 may extract information related to the search result in consideration of the importance of each entity.

Figure 6:
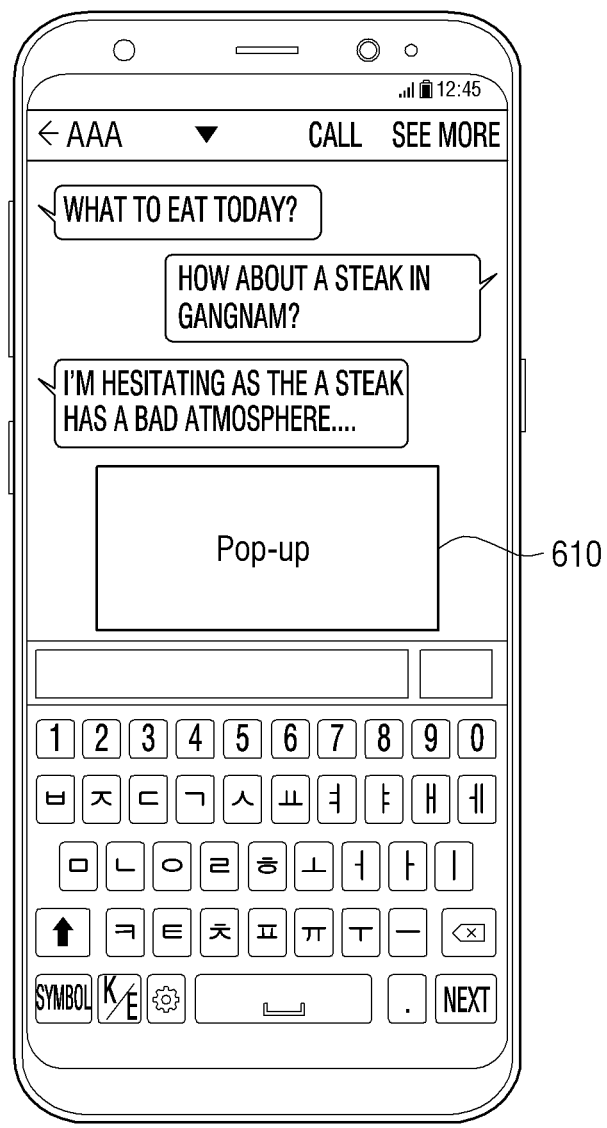
FIG. 6 is a diagram illustrating an example method for using a context according to another embodiment.

FIG. 6 is a diagram illustrating an example method for using a context according to another embodiment.

The processor 120 may identify a plurality of entities included in the input sentence. The processor 120, when a sentence having a negative expression is input, may perform a search based on a word having an opposite meaning of the negative expression.

For example, as illustrated in FIG. 6, the processor 120 may identify "A Steak" as the entity, and may receive a sentence having a negative expression of bad atmosphere. In this example, the processor 120 may search a steak store with a good atmosphere and provide the search result as a pop-up window 610.

Figure 7:
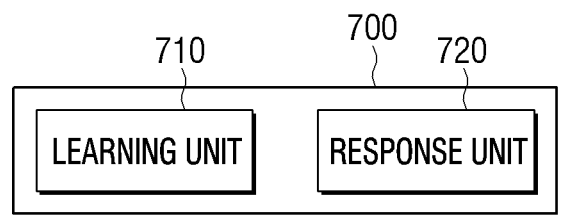
FIG. 7 is a block diagram illustrating an example configuration of another electronic apparatus according to an embodiment.

FIG. 7 is a block diagram illustrating an example configuration of another electronic apparatus 700 according to an embodiment. The electronic apparatus 700 may be an apparatus which acquires the entity identification model through an AI algorithm.

Referring to FIG. 7, the electronic apparatus 700 may include at least one of a learning unit (e.g., including various processing circuitry and/or executable program elements) 710 and a response unit (e.g., including various processing circuitry and/or executable program elements) 720.

The learning unit 710 may include various processing circuitry and/or executable program elements and generate or train an AI model for identifying the entity using the learning data. The learning unit 710 may generate a determination model having a determination criterion using the collected learning data.

The response unit 720 may include various processing circuitry and/or executable program elements and obtain the entity included in a predetermined dialogue using the predetermined data as input data of the trained AI model.

According to an example embodiment, the learning unit 710 and the response unit 720 may be included in the another electronic apparatus 700, but this is merely an example, and the units may be embedded in the electronic apparatus 100. For example, at least a portion of the learning unit 710 and at least a portion of the response unit 720 may be implemented as software modules and/or at least one hardware chip form and mounted in the electronic apparatus 100. For example, at least one of the learning unit 710 and the response unit 720 may be manufactured in the form of an exclusive-use hardware chip for AI, or a conventional general purpose processor (e.g., a CPU or an application processor) or a graphics-only processor (e.g., a GPU) and may be mounted on various electronic devices described above. The exclusive-use hardware chip for AI may, for example, and without limitation, include a dedicated processor for probability calculation, and it has higher parallel processing performance than existing general purpose processor, so it can quickly process computation tasks in AI such as machine learning. When the learning unit 710 and the response unit 720 are implemented as a software module (or a program module including an instruction, executable program elements, or the like), the software module may be stored in a computer-readable non-transitory computer readable media. The software module may be provided by an operating system (OS) or by a predetermined application. Some of the software modules may be provided by an OS, and some of the software modules may be provided by a predetermined application.

The learning unit 710 and the response unit 720 may be mounted on one electronic apparatus, or may be mounted on separate electronic apparatuses, respectively. For example, one of the learning unit 710 and the response unit 720 may be included in the electronic apparatus 100, and the other one may be included in another electronic apparatus 700. In addition, the learning unit 710 and the response unit 720 may provide the model information constructed by the learning unit 710 to the response unit 720 via wired or wireless communication, and provide data which is input to the response unit 720 to the learning unit 710 as additional data.

Figure 8:
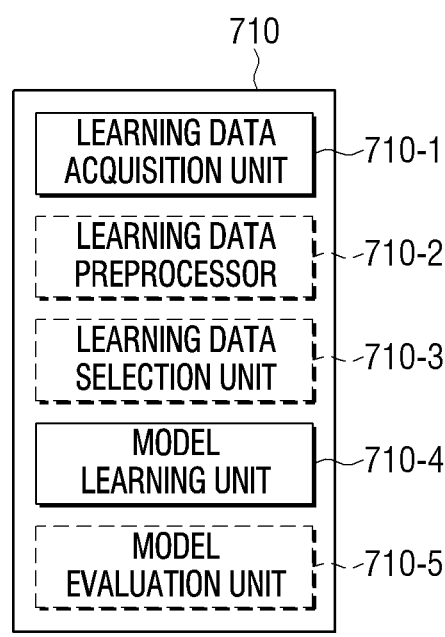
FIG. 8 is a block diagram illustrating an example learning unit according to an embodiment.

FIG. 8 is a block diagram illustrating an example learning unit 710 according to an embodiment.

Referring to FIG. 8, the learning unit 710 according to some embodiments may implement a learning data acquisition unit (e.g., including various processing circuitry and/or executable program elements) 710-1 and a model learning unit (e.g., including various processing circuitry and/or executable program elements) 710-4. The learning unit 710 may further selectively implement at least one of a learning data preprocessor (e.g., including various processing circuitry and/or executable program elements) 710-2, a learning data selection unit (e.g., including various processing circuitry and/or executable program elements) 710-3, and a model evaluation unit (e.g., including various processing circuitry and/or executable program elements) 710-5.

The learning data acquisition unit 710-1 may include various processing circuitry and/or executable program elements and obtain learning data necessary for the artificial intelligence model for correcting the luminance value of the image. The learning data acquisition unit 710-1 may obtain a plurality of sample images or information corresponding to each of a plurality of sample images as learning data. The learning data may be data collected or tested by the learning unit 710 or the manufacturer of the learning unit 710.

The model learning unit 710-4 may include various processing circuitry and/or executable program elements and can use the learning data so that the artificial intelligence model has a criterion for correcting the luminance value of the image. For example, the model learning unit 710-4 can learn an artificial intelligence model through supervised learning of at least a part of the learning data. The model learning unit 710-4 may learn, for example, by itself using learning data without specific guidance to make the artificial intelligence model learn through unsupervised learning which detects a criterion for providing correction for a luminance value. The model learning unit 710-4 can learn the artificial intelligence model through reinforcement learning using, for example, feedback on whether the result of providing the response according to learning is correct. The model learning unit 710-4 can also make an artificial intelligence model learn using, for example, a learning algorithm including an error back-propagation method or a gradient descent.

In addition, the model learning unit 710-4 may learn a selection criterion about which learning data should be used for identifying the entity using input data.

The model learning unit 710-4 can determine an artificial intelligence model having a great relevance between the input learning data and the basic learning data as an artificial intelligence model to be learned when there are a plurality of artificial intelligence models previously constructed. In this case, the basic learning data may be pre-classified according to the type of data, and the AI model may be pre-constructed for each type of data.

When the artificial intelligence model is learned, the model learning unit 710-4 can store the learned artificial intelligence model. In this case, the model learning unit 710-4 can store the learned artificial intelligence model in the memory of the another electronic device 700. The model learning unit 710-4 may store the learned artificial intelligence model in a memory of a server or an electronic device connected to the another electronic device 700 via a wired or wireless network.

The learning unit 710 may further implement a learning data preprocessor 710-2 and a learning data selection unit 710-3 each of which may include various processing circuitry and/or executable program elements to improve the response result of the artificial intelligence model or to save resources or time required for generation of the artificial intelligence model.

The learning data preprocessor 710-2 may, for example, preprocess acquired data so that the data obtained in the learning for identifying the entity from the dialogue can be used. That is, the learning data preprocessor 710-2 can process the acquired data into a predetermined format. For example, the learning data preprocessor 710-2 can classify the sample dialogue into a plurality of sections.

The learning data selection unit 710-3 may, for example, select data required for learning from the data acquired by the learning data acquisition unit 910-1 or the data preprocessed by the learning data preprocessor 710-2. The selected learning data may be provided to the model learning unit 710-4. The learning data selection unit 710-3 can select learning data necessary for learning from the acquired or preprocessed data in accordance with a predetermined selection criterion. The learning data selection unit 710-3 may also select learning data according to a predetermined selection criterion by learning by the model learning unit 710-4.

The learning unit 710 may further implement the model evaluation unit 710-5 which may include various processing circuitry and/or executable program elements to improve a response result of the artificial intelligence model.

The model evaluation unit 710-5 may input evaluation data to the artificial intelligence model, and if the response result which is output from the evaluation result does not satisfy a predetermined criterion, the model evaluation unit may make the model learning unit 710-4 learn again. The evaluation data may be predetermined data for evaluating the artificial intelligence model.

When there are a plurality of learned artificial intelligence models, the model evaluation unit 710-5 may evaluate whether each learned artificial intelligence model satisfies a predetermined criterion, and determine the model which satisfies a predetermined criterion as a final artificial intelligence model. When there are a plurality of models that satisfy a predetermined criterion, the model evaluation unit 710-5 may determine one or a predetermined number of models which are set in an order of higher evaluation score as a final artificial intelligence model.

Figure 9:
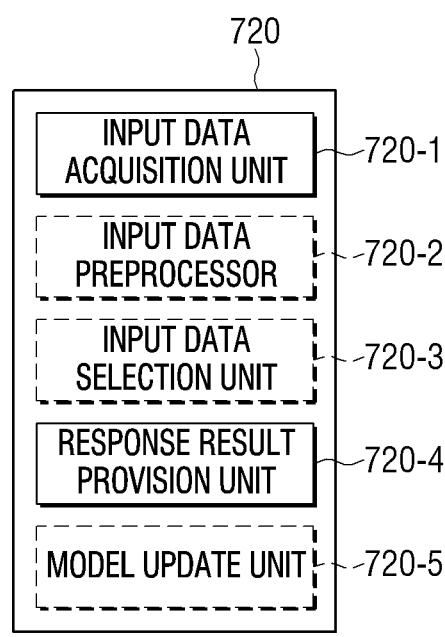
FIG. 9 is a block diagram illustrating an example response unit according to an embodiment.

FIG. 9 is a block diagram illustrating an example response unit 720 according to an embodiment.

Referring to FIG. 9, the response unit 720 according to some embodiments may implement the input data acquisition unit (e.g., including various processing circuitry and/or executable program elements) 720-1 and the response result provision unit (e.g., including various processing circuitry and/or executable program elements) 720-4.

In addition, the response unit 720 may further implement at least one of an input data preprocessor (e.g., including various processing circuitry and/or executable program elements) 720-2, an input data selection unit (e.g., including various processing circuitry and/or executable program elements) 720-3, and a model update unit (e.g., including various processing circuitry and/or executable program elements) 720-5 in a selective manner.

The input data acquisition unit 720-1 may include various processing circuitry and/or executable program elements and obtain data necessary for identifying the entity. The response result provision unit 720-4 may include various processing circuitry and/or executable program elements and apply the input data obtained from the input data acquisition unit 720-1 to the learned artificial intelligence model as an input value to identify the entity from the dialogue. The response result provision unit 720-4 applies the data selected by the input data preprocessor 720-2 or the input data selection unit 720-3 to be described in greater detail below to the AI model to obtain the response result. The response result can be determined by the AI model.

According to an embodiment, the response result provision unit 720-4 may apply the artificial intelligence model which identifies the entity obtained from the input data acquisition unit 720-1 to identify the entity from the dialogue.

The response unit 720 may further implement the input data preprocessor 720-2 and the input data selection unit 720-3 in order to improve a response result of the AI model or save resources or time to provide the response result.

The input data preprocessor 720-2 may include various processing circuitry and/or executable program elements and preprocess the acquired data so that the acquired data can be used to correct the luminance value of the image. That is, the input data preprocessor 720-2 can process the obtained data into the pre-defined format by the response result provision unit 720-4.

The input data selection unit 720-3 may include various processing circuitry and/or executable program elements and select data required for providing a response from the data acquired by the input data acquisition unit 720-1 or the data preprocessed by the input data preprocessor 720-2. The selected data may be provided to the response result provision unit 720-4. The input data selection unit 720-3 can select some or all of the obtained or preprocessed data according to a predetermined selection criterion for providing a response. The input data selection unit 720-3 can also select data according to a predetermined selection criterion by learning by the model learning unit 710-4.

The model update unit 720-5 may include various processing circuitry and/or executable program elements and control the updating of the artificial intelligence model based on the evaluation of the response result provided by the response result provision unit 720-4. For example, the model update unit 720-5 may provide the response result provided by the response result provision unit 720-4 to the model learning unit 710-4 so that the model learning unit 710-4 can ask for further learning or updating the AI model.

Figure 10:
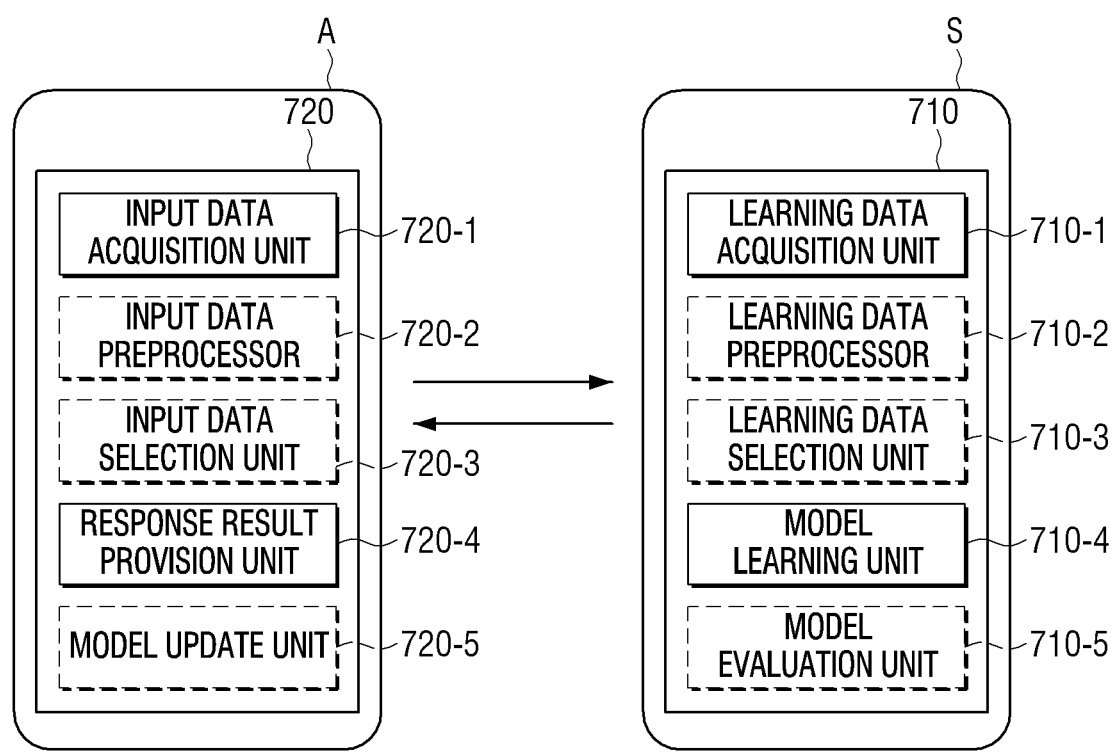
FIG. 10 is a diagram illustrating an example of learning and determining data by the electronic apparatus and an external server in association with each other according to an embodiment.

FIG. 10 is a diagram illustrating an example of learning and determining data by interworking an electronic apparatus 100 (A) and an external server (S) according to an embodiment.

Referring to FIG. 10, an external server (S) may learn a criterion for identifying the entity from the dialogue, and the electronic apparatus 100 may identify the entity from the dialogue based on the learning result by the server (S).

In this example, the model learning unit 710-4 of the server S can perform the function of the learning unit 710 shown in FIG. 8. For example, the model learning unit 710-4 of the server S may learn criteria regarding which dialogue should be used to identify the entity, and how to identify the entity using the aforementioned information.

The response result provision unit 720-4 of the electronic apparatus 100 applies the data selected by the input data selection unit 720-3 to the artificial intelligence model generated by the server S to identify the entity from dialogue. The response result provision unit 720-4 of the electronic apparatus 100 may receive the artificial intelligence model generated by the server S from the server S, and identify the entity from the dialogue using the received artificial intelligence model.

Figure 11:
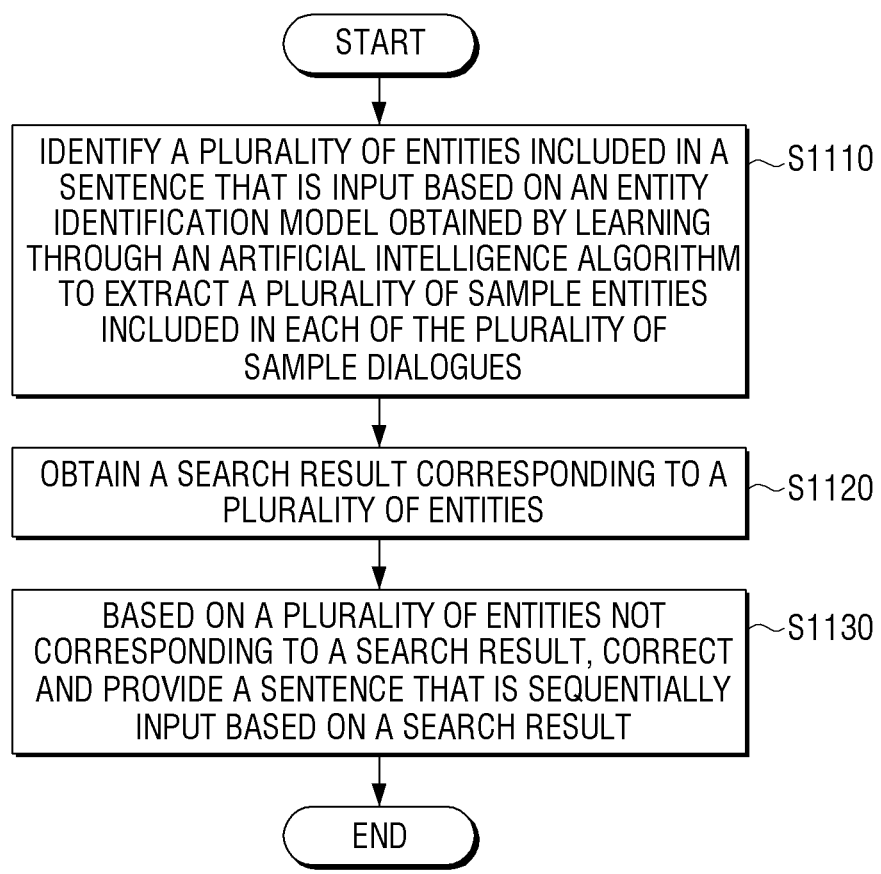
FIG. 11 is a flowchart to illustrating an example method of controlling an electronic apparatus according to an embodiment.

FIG. 11 is a flowchart illustrating an example method of controlling an electronic device according to an embodiment.

A plurality of entities included in a sentence that is input based on the entity identification model that is obtained by learning through the AI algorithm so as to extract the sample entity or plurality of sample entities included in each of the plurality of sample dialogues is identified in operation S1110. A search result corresponding to the plurality of entities is obtained in operation S1120. When the plurality of entities does not correspond to the search result, the sentence that is input based on the search result is corrected and provided in operation S1130.

The providing in operation S1130 may include identifying attributes of each of the plurality of entities and identifying whether the plurality of entities corresponds to the search result based on at least one of the plurality of identified attributes.

When the plurality of entities does not correspond to the search result, the providing in operation S1130 may further include the operation of providing a guide message to guide that there is an error in the plurality of entities.

The obtaining in operation S1120 may obtain the search result corresponding to at least two entities having different attributes.

The providing in operation S1130 may include obtaining importance for each of the plurality entities based on a context of the input sentence and identifying whether the remaining entities correspond to the search result based on the entity having the highest importance among the plurality of entities.

The identifying in operation S1110 may identify a plurality of words included in the input sentence and identify a plurality of entities among the plurality of words based on a context of the input sentence.

The identifying in operation S1110 may, when the second sentence that is subsequent to the first sentence, among the input sentences, is an affirmative sentence, identify the first word identified in a sentence as one of the plurality of entities.

The identifying in operation S1110 may, when the second sentence that is subsequent to the first sentence among the input sentences is a negative sentence, not use the first word that is identified in the sentence among the plurality of words as a plurality of entities.

The providing in operation S1130 may provide information related to the search result by correcting the input sentence, when there is an error in the input sentence.

When a command, e.g., a user command, is input, the step of proving the plurality of entities used for obtaining the search result may be further included.

According to various example embodiments, the electronic apparatus may reduce required data capacity and improve speed of information providing according to a context by using the entity identification model that is trained through the AI algorithm.

The methods according to various embodiments as described above may be implemented as an application format which may be installed in an electronic apparatus.

The methods according to various example embodiments as described above may be implemented by software upgrade and/or hardware upgrade for the electronic apparatus.

The various example embodiments as described above may be performed through an embedded server provided in the electronic apparatus or an external server of the electronic apparatus.

According to the disclosure, various example embodiments as described above may be implemented with software including instructions stored in the machine-readable storage media readable by a machine (e.g., computer). According to one or more embodiments, an apparatus may call instructions from the storage medium and operate according to the called instructions, and may include an electronic apparatus (e.g., electronic apparatus A). When an instruction is executed by a processor, the processor may perform functions corresponding to the instruction, either directly or under the control of the processor, using other components. The instructions may include a code made by a compiler or a code executable by an interpreter. A machine-readable storage medium may be provided in the form of a non-transitory storage medium.

According to various example embodiments of the disclosure, a method may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

Each of the elements (for example, a module or a program) according to various example embodiments may include a single entity or a plurality of entities, and some sub-elements of the abovementioned sub-elements may be omitted, the elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order.

While various embodiments have been illustrated and described with reference to certain drawings, the disclosure is not limited to the example embodiments or the drawings, and it will be understood by those of ordinary skill in the art that various changes in form and details may be made therein without departing from the spirit and scope as defined, for example, by the following claims and their equivalents.

What is claimed is:

1. An electronic apparatus comprising:
   a memory configured to store an entity identification model; and
   a processor configured to control the electronic apparatus to:
   identify a plurality of entities included in an input sentence input based on the entity identification model,
   identify an attribute of each of the plurality of entities,
   acquire a search result corresponding to the plurality of entities,
   identify whether the plurality of entities corresponds to the search result based on the plurality of identified attributes, and
   based on the plurality of entities not corresponding to the search result, display a message indicating that the plurality of entities in the input sentence includes an error,
   wherein the entity identification model is acquired by learning through an artificial intelligence algorithm to extract a plurality of sample entities included in each of a plurality of sample dialogues.

2. The electronic apparatus of claim 1, wherein the message is a guide message for correcting the error.

3. The electronic apparatus of claim 1, wherein the processor is further configured to control the electronic apparatus to acquire a search result corresponding to at least two entities having different attributes.

4. The electronic apparatus of claim 1, wherein the processor is further configured to control the electronic apparatus to:
   acquire an importance for each of the plurality of entities based on a context of the input sentence, and
   identify whether a remaining entity among the plurality of entities corresponds to the search result for an entity having a highest importance among the plurality of entities.

5. The electronic apparatus of claim 1, wherein the processor is further configured to control the electronic apparatus to:
   identify a plurality of words included in the input sentence, and
   identify the plurality of entities among the plurality of words based on a context of the input sentence.

6. The electronic apparatus of claim 5, wherein the processor is further configured to control the electronic apparatus to: based on a second sentence subsequent to a first sentence among the input sentences being an affirmative sentence, identify a first word, among the plurality of words, identified in the first sentence as one of the plurality of entities.

7. The electronic apparatus of claim 5, wherein the processor is further configured to control the electronic apparatus to: based on a second sentence subsequent to a first sentence among the input sentences being a negative sentence, not use a first word, among the plurality of words, identified in the first sentence as the plurality of entities.

8. The electronic apparatus of claim 1, wherein the processor is further configured to control the electronic apparatus to: based on an error being present in the plurality of entities, correct the input sentence and provide the corrected input sentence.

9. The electronic apparatus of claim 1, wherein the processor is further configured to control the electronic apparatus to: based on a command being input, provide the plurality of entities used for acquiring the search result.

10. A method of controlling an electronic apparatus, the method comprising:
    identifying a plurality of entities included in an input sentence input based on an entity identification model;
    identifying an attribute of each of the plurality of entities;
    acquiring a search result corresponding to the plurality of entities;
    identifying whether the plurality of entities corresponds to the search result based on the plurality of identified attributes, and
    based on the plurality of entities not corresponding to the search result, displaying a message indicating that the plurality of entities in the input sentence includes an error,
    wherein the entity identification model is obtained by learning through an artificial intelligence algorithm to extract a plurality of sample entities included in each of a plurality of sample dialogues.

11. The method of claim 10, wherein the message is a guide message for correcting the error.

12. The method of claim 10, wherein the acquiring comprises: acquiring a search result corresponding to at least two entities having different attributes.

13. The method of claim 10, wherein the method further comprises:
    acquiring an importance for each of the plurality of entities based on a context of the input sentence; and
    identifying whether a remaining entity among the plurality of entities corresponds to the search result for an entity having a highest importance among the plurality of entities.

14. The method of claim 10, wherein the identifying comprises:
  identifying a plurality of words included in the input sentence, and
  identifying the plurality of entities among the plurality of words based on a context of the input sentence.

15. The method of claim 14, wherein the identifying comprises: based on a second sentence subsequent to a first sentence among the input sentences being an affirmative sentence, identifying a first word, among the plurality of words, identified in the first sentence as one of the plurality of entities.

16. The method of claim 14, wherein the identifying comprises: based on a second sentence subsequent to a first sentence among the input sentences being a negative sentence, not using a first word, among the plurality of words, identified in the first sentence as the plurality of entities.

17. The method of claim 10, wherein the method further comprises: based on an error being present in the plurality of entities, correcting the input sentence and providing the corrected input sentence.

18. The method of claim 10, further comprising:
  based on a command being input, providing the plurality of entities used for acquiring the search result.

19. The method of claim 10, wherein the search result indicates locations of the plurality of entities and the association between each of the plurality of entities is satisfied when a distance between locations of the plurality of entities is less than a predetermined distance.

\* \* \* \* \*